United States Patent [19]

Meibach et al.

[11] Patent Number: 5,783,236

[45] Date of Patent: Jul. 21, 1998

[54] MANUFACTURE OF PARTICULATE NATURAL CHEESE WITHOUT BLOCK FORMATION

[75] Inventors: Ronald L. Meibach, Deerfield; Dale A. Kyser, Vernon Hills; Gary F. Smith, Highland Park; David Kaganoff; Ronald D. Gee, both of Chicago, all of Ill.

[73] Assignee: Kraft Foods, Inc., Northfield, Ill.

[21] Appl. No.: 568,592

[22] Filed: Dec. 5, 1995

[51] Int. Cl.$^6$ ............................................... A23C 19/06
[52] U.S. Cl. .......................... 426/36; 426/38; 426/582; 426/524
[58] Field of Search .................... 426/36, 39, 40, 426/34, 38, 582, 524, 392, 422, 443

[56] References Cited

U.S. PATENT DOCUMENTS

| | | | |
|---|---|---|---|
| 3,072,489 | 1/1963 | Hurlburt et al. | 426/582 |
| 3,543,403 | 12/1970 | Speglic et al. | 426/582 |
| 3,829,594 | 8/1974 | Schweizer | 426/582 |
| 3,966,970 | 6/1976 | Williams | 426/393 |
| 4,306,493 | 12/1981 | Hain et al. | 99/459 |
| 5,454,232 | 10/1995 | Lermuzeaux | 62/374 |

FOREIGN PATENT DOCUMENTS

| | | |
|---|---|---|
| 0 069 282 | 1/1983 | European Pat. Off. |
| 0 455 967 | 11/1991 | European Pat. Off. |
| 2 644 319 | 9/1990 | France .................. 426/582 |
| 290 568 | 6/1991 | German Dem. Rep. ....... 426/582 |
| 61-13543 | 6/1986 | Japan ................... 426/582 |

*Primary Examiner*—William H. Beisner
*Attorney, Agent, or Firm*—Fitch, Even, Tabin & Flannery

[57] ABSTRACT

The present invention is directed to a method for making a particulate natural cheese suitable for preparation of processed cheese, as well as for use as a natural cheese, such as a snack food and shreds for cheese toppings. In the method, a milk coagulum is provided. The coagulum is cut to provide particulate cheese curds and whey. The cheese curd is cooked while undergoing agitation. Thereafter, whey is drained from the cheese curd while the cheese curd is continuously agitated. The cheese curd is then cooled or dried sufficiently to maintain the cheese curd as separate particles. Agitation may be used during or immediately after the cooling or drying step to insure separation of the cheese particles. The cheese particles formed may form friable lumps but do not knit during storage. The cheese particles are then packed into relatively large containers holding from about 1,000 to about 2,500 pounds of cheese curd or may be bulk packed in rail cars or trucks. The containers are preferably bulk bags with a liner of plastic or other disposable material. The liners are gas flushed before and during filling to reduce the oxygen content and inhibit mold growth. The liners may be disposed of after use in transporting the cheese curd to a final destination. The bulk bags are reusable with fresh liners.

13 Claims, 2 Drawing Sheets

PROCESS OF THE INVENTION

CONVENTIONAL PROCESS

PROCESS OF THE INVENTION

CONVENTIONAL PROCESS

PROCESS OF THE INVENTION

MANUFACTURE OF PARTICULATE NATURAL CHEESE WITHOUT BLOCK FORMATION

FIELD OF THE INVENTION

The present invention relates generally to a method for making a natural cheese from milk which normally requires a block formation step, but which does not include the block formation step. More particularly, the present invention is directed to producing natural cheese which is in a particulate form and has advantages when used as a "cheese for manufacture" in making processed cheese.

The term "cheese for manufacture" is understood in the industry to mean a cheese made from milk which may be used as a component in processed cheese products. The natural cheese made in accordance with the present invention is particularly useful in a processed cheese process to produce a non-fat, low-fat or full fat processed cheese.

BACKGROUND OF THE INVENTION

In one conventional method for the manufacture of cheddar cheese, a batch of milk is placed in a cheese vat and is inoculated with a lactic acid starter. After the desired degree of lactic acid development has been attained, rennet is added to set or coagulate the milk. When the resulting curd has attained the proper degree of firmness, the curd is cut into cubes with curd knives. The curd is then agitated in the whey and heated to a temperature of about 100° F. to about 105° F., the heating of the curd to the desired temperature, preferably takes place over a period of about 30 minutes. The curd is held at this temperature and agitation of the curd is continued until the acidity of the whey reaches about 0.13 to 0.16, expressed as percent lactic acid or its equivalent, at which time the heating is terminated and the whey is drained from the cheese vat. Usually, the temperature is maintained for about one hour. The mass of curd is then formed or "ditched" to facilitate whey drainage.

The curd is then allowed to knit and drain after which it is cut into blocks or slabs which are turned on the bottom of the vat. After about one hour, the slabs are stacked, cut and restacked by hand during which time the acidity of the curd increases and further amounts of whey are expelled from the curd. The cutting, turning and stacking of the cheese curd in the cheese vat is known as "cheddaring". Cheddaring is usually continued for a period of about two hours until the desired knit and smoothness of curd is achieved. The cheese curd is then milled into small pieces which may be washed, after which the curd is salted with an amount of salt to provide a total salt content of from about 1.65 to 1.9 percent by weight of the curd. The salted curd is then placed in hoops and pressed overnight. The pressed curd is then wrapped and cured until the curd has knit to form a solid block and desired flavor characteristics are attained.

Cheddar cheese has a fat content of at least about 50% on a dry basis and has not more than 39% moisture. After the moisture of the curd has been reduced to less than about 39%, the cheddar curd containing 50% fat, dry basis, does not undergo any further syneresis or expulsion of whey.

Many improvements have been directed to the cheddar cheese manufacturing operation to reduce the time required for draining the whey from the curd to attain the proper level of moisture. U.S. Pat. Nos. 3,969,995, 4,049,838 and 4,234,615, all to Krueger, et al. are directed to the use of a drainer blade which is inserted into a mass of cheddar curd. The drainer blade is V-shaped and has a number of holes for drainage of whey. As reported in the Krueger, et al. patents, the drainage time can be reduced to as little as 15 minutes after the drainer blades are inserted into the mass of curd and pressure is applied. The '615 Krueger patent reports uniform moisture attained in the curd block after pressing times of about 15 minutes to attain moisture contents in the range of about 37% to 42%. No further draining is required after the pressing step utilizing the drainer blades since no further syneresis of whey occurs in the cheddar curd.

In the manufacture of cheddar cheese, it has become standard practice to cure the cheese in the form of 640 lb. blocks. It is not practical to use larger sized blocks, since the amount of time to cool the interior of the cheese block to the 40° F. temperature used during curing of the cheese block would be too long. It takes up to 5 days to cool the interior of a 640 lb. block of cheese to 40° F. Another problem associated with the pressing and curing of large blocks of cheese is that the stainless steel containers used in the pressing and curing steps must be cleaned and recycled. A further problem is that the large block of cheese must be cut into pieces and comminuted by suitable equipment to provide cheese particles prior to being used in the manufacture of processed cheese.

Accordingly, it is a principal object of the present invention to produce natural cheese suitable for use in manufacturing processed cheese which has a particulate form that is ready to be blended into a process cheese manufacturing operation. It is another object of the present invention to provide a method for producing a particulate natural cheese wherein the cheese can be transferred in large quantities without knitting of the individual particles occurring.

SUMMARY OF THE INVENTION

The present invention is directed to a method for making a particulate natural cheese suitable for preparation of processed cheese, as well as for use as a natural cheese, such as a snack food and shreds for cheese toppings. In the method, a milk coagulum is provided. The coagulum is cut to provide particulate cheese curds and whey. The cheese curd is cooked while undergoing agitation. Thereafter, whey is drained from the cheese curd while the cheese curd is continuously agitated. The cheese curd is then cooled or dried sufficiently to maintain the cheese curd as separate particles. Agitation may be used during or immediately after the cooling or drying step to insure separation of the cheese particles. The cheese particles formed may form friable lumps but do not knit during storage. The cheese particles are then packed into relatively large containers holding from about 1,000 to about 2,500 pounds of cheese curd or may be bulk packed in rail cars or trucks. The containers are preferably bulk bags with a liner of plastic or other disposable material. The liners are gas flushed before and during filling to reduce the oxygen content and inhibit mold growth.

The liners may be disposed of after use in transporting the cheese curd to a final destination. The bulk bags are reusable with fresh liners.

DETAILED DESCRIPTION OF THE INVENTION

Figure 1:
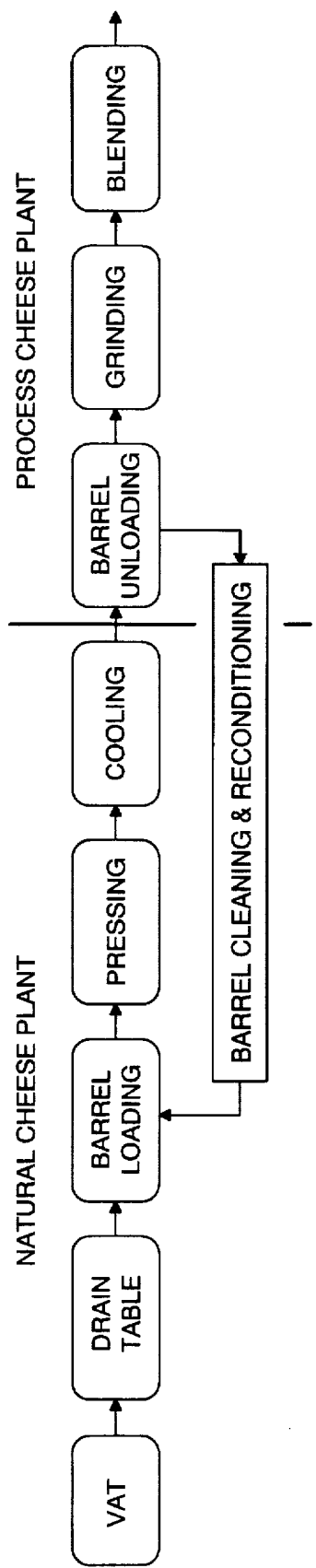
FIG. 1 is a flow chart depicting a conventional process for producing cheddar cheese for manufacturing.

A conventional process for making a cheddar cheese for manufacturing is shown in FIG. 1. In the method, a batch of milk is placed in a cheese vat and is inoculated with a lactic acid starter culture while the milk is at a temperature of about 88° F. The lactic acid starter may be in a bulk or direct vat set concentration. Such cultures are well known in the cheese making art. After the desired degree of lactic acid development has been attained, rennet is added to set or coagulate the milk. When the resulting curd has attained the proper degree of firmness, the curd is cut into cubes with curd knives. The curd is then agitated in the whey and heated to a temperature of from about 100° F. to about 105° F. The curd is held at this temperature with agitation of the curd continued until the pH of the whey is from about 5.8 to about 6.0. At this time, the heating is terminated and the curd and whey are transferred to a drain table. The temperature of the curd on the drain table is from about 110° F. to about 120° F. After about 25 minutes on the drain table, the curd is salted and then transferred to barrels. The curd is pressed in the barrels for a period of about 2 hours under a vacuum of about 28 "hg. The moisture after pressing is from about 33 to about 36%. The curd is stored in the barrels in a cold room maintained at about 40° F. for a period of from 3 to 5 days to reduce the temperature in the interior of the barrels to about 40° F. The pH of the curd after cooling is less than 5.35.

The cooled barrels can then be transferred to a process cheese plant. Alternatively, the curd can be cured in the barrels for a period of from about 70 to about 120 days to provide a short hold flavored cheese and for a period of from about 120 to about 210 days for long hold flavored cheese.

In use in the process cheese plant, the curd, which has now knitted into a solid block, is removed from the barrel and is cut into large pieces which are ground into a particulate form for use in making the process cheese. The cheese, if the cheese is a cheese for manufacturing, is then blended with flavored cheeses and is heated to melt the cheese and provide the process cheese product.

Figure 2:
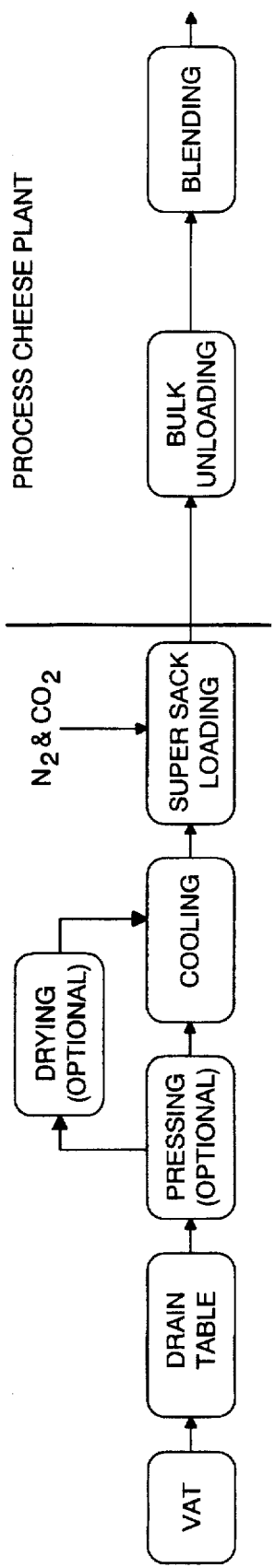
FIG. 2 is a flow chart showing the process of the present invention for producing particulate natural cheese for manufacturing.

The method of the present invention for providing a particulate cheese curd for manufacture is shown in FIG. 2. A batch of milk is placed in a cheese vat and is inoculated with a lactic acid starter. The lactic acid starter is used at a level from about 10 lbs. to about 20 lbs. of bulk lactic starter culture per 1000 lbs. of milk as compared to the conventional use of from about 10 lbs. to about 15 lbs. After the desired degree of lactic acid development has been attained, a coagulant, such as rennet, is added to set or coagulate the milk.

When the resulting curd has attained the desired degree of firmness, the curd is cut into pieces with curd knives. The pieces have a square, rectangular or irregular shape with the maximum dimension being about 2 inches and the minimum dimension being about 1/16 inch. The size of the pieces is dependent on the intended final use; larger sizes are used for consumption as is, while smaller sizes are used in the manufacture of process cheese. The curd is agitated in the whey and heated to a temperature of from about 100° F. to about 105° F. in 30 minutes with agitation. After cooking for 15 minutes, the agitation is increased. The vats are held at the elevated temperature until the pH drops to 5.7–5.8. After completion of 30 minutes of cooking, a pre-draw step can be performed, removing up to 80% of the whey. The curd is then pumped to the drain table while at a temperature of about 105° F. After the initial whey is drained of, a pre-salting at 0.2 to 1.0 pounds of salt per 100 pounds of curd can be performed, if desired. The curd is drained with agitation until a pH of from about 4.8 to about 5.3 is attained. Salt is then added to the curd on the drain table to reach a final salt level of 1.9% by weight, based on the weight of the curd. All percentages used herein are by weight unless otherwise indicated.

In the embodiment shown in FIG. 2, the curd is pressed in 40 pound batches for a period of from about 1 to 5 minutes at 1 to 10 psi with no vacuum. The 40 pound blocks are then placed into a suitable vessel, such as a V-Blender while at a temperature of from about 85° F. to about 95° F. The curd has not had time to establish any knitting and is at a sufficiently low pH that it is easily fragmented into curd particles in the blender. While in the blender, a cooling medium, such as cryogenic liquid nitrogen, is passed through the curd to cool the curd particles in a period of less than about 30 minutes to an internal curd particle temperature of from about 40° F. to about 50° F.

The rapid cooling of the curd particles in combination with the low pH and moisture level establishes a hardening effect on the surface of the curd particles which inhibits and prevents curd knitting upon subsequent handling. The curd particles can then be packed into large containers for immediate transfer to a final destination, such as a process cheese plant. Preferred containers are heavy duty reinforced woven plastic containers which have a rectangular shape and which can contain from about 1000 lbs. to about 2500 lbs. of curd. These containers are known in industry by the term bulk bags. The container size is about 3 feet×3 feet×5 feet. The containers are flushed with an inert gas, such as nitrogen and carbon dioxide before and during filling to lower the oxygen level in the container to less than about 2%, i.e., 10% air. This prevents any mold growth from occurring.

While the curd at the bottom of the container is subjected to substantial pressure, no knitting of the curd particles occurs. The large bags of curd can be stacked at least two high without establishing any substantial level of knitting of the curd by the pressure of the stacked bags of curd. Even when the curd particles are cured for a period of from about 10 to about 210 days to develop flavor, no substantial knitting occurs.

When used at the process cheese plant, the curd particles are merely unloaded from the large containers and transferred to blending equipment for manufacture of the process cheese. While not necessary, grinding of the curd particles may be performed.

In an alternative embodiment, a particulate curd is provided without a pressing step. In this embodiment, a two-step cooking process is used and two types of lactic producing cultures are used. The first type is a mesophilic lactic culture, such as *S. Lactis*, which is effective at temperatures up to about 105° F. and a thermophilic lactic culture, such as *S. Thermophilus*, which is effective to a temperature of up to about 120° F. In this embodiment, the combination of the mesophilic lactic culture and the thermophilic lactic culture are again used at combined levels higher than is used in the conventional manufacture of cheddar cheese. The mesophilic bulk lactic culture is used at a level of from about 3 lbs. to about 10 lbs. per 1000 lbs. of milk and a thermophilic bulk culture is used at a level of from about 3 to about 10 lbs. per 1000 lbs. of milk. The rennet level, double strength, is from about 25 mls. to about 100 mls. per 1000 lbs. of milk.

In this embodiment, the milk is added to the vat and the culture is added while the milk is at a temperature of about 90° F. After ripening for 1 hour, the rennet, diluted with distilled water, is added to the vat and the mixture is held for about 30 minutes. The coagulum is then cut to ¼ inch sized pieces. Mixers are started to agitate the curd. Cooking is started about 15 minutes after the start of the cut. The curd is cooked from a temperature of 90° F. to a temperature of from about 100° F. to about 105° F. in about 30 minutes. After cooking for 15 minutes, the agitation level is increased. The curd is held at the elevated temperature and from about 20% to about 80% of the whey is predrawn.

The curd is then subjected to a second cooking step in the reduced level of whey. In the second cooking step, the temperature of the curd is raised from the 100° F. to 105° F. range to a temperature in the range of from about 115° F. to about 120° F. over a period of 15 to 30 minutes. The use of the second higher temperature cooking step eliminates the need for a subsequent pressing step. The curd is then cooled in the vat from a temperature of from about 118° F. to about 104° F. over a period of about 15 minutes. The curd is held in the vats at a temperature in the range of from about 100° F. to about 105° F. while mixing until the pH drops to a level of from about 5.6 to about 5.9. The curd is then pumped to the drain table while at a temperature in the range of from about 100° F. to about 105° F. Pre-salting may be effected at this time, if desired. The curd is drained and stirred on the drain table until the pH is from about 4.8 to about 5.3. This is a pH level that is usually attained only during curing of large blocks of cheese in the conventional make procedure. In the method of the invention, the pH is reduced up front and is not further reduced during subsequent steps. Additional salt is then added on the drain table to reach a level of 1.9%.

The curd from the drain table is then transferred to a suitable vessel, such as a V-Blender while at a temperature of from about 85° F. to about 95° F. A cryogenic liquid, such as liquid nitrogen is then passed through the blender and the curd is cooled to an internal temperature of from about 40° F. to about 50° F. over a period of less than about 30 minutes.

The milk used in the method of the present invention can be full-fat milk, reduced fat milk or skim milk, i.e., the milk can have a fat content of from about 0% to about 4%.

The curd particles are then loaded into large containers as previously described.

Figure 3:
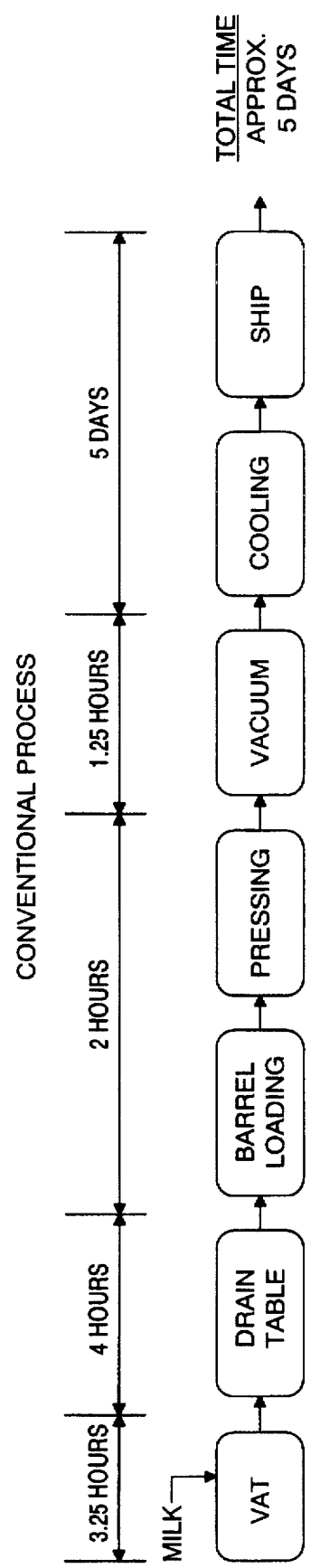
FIG. 3 is a flow diagram showing the relative times involved in a conventional process for the preparation of cheese for manufacturing.
Figure 4:
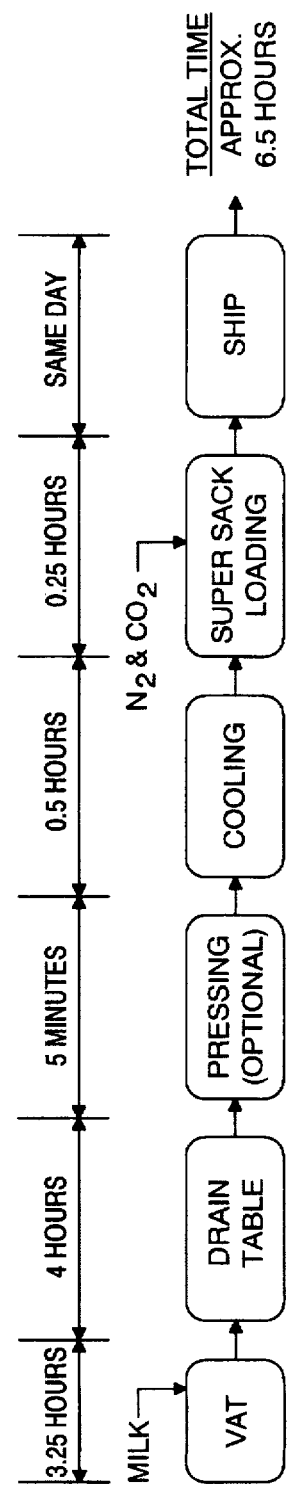
FIG. 4 is a flow sheet showing relative times for producing the particulate cheese for manufacturing of the present invention.

The various times involved in the make procedure of a conventional process for making cheese for manufacture and the process of the invention for making cheese for manufacture is shown in FIGS. 3 and 4. As can be seen, the present invention can provide curd particles for use in the manufacture of process cheese on the same day that the process is started. In a conventional process for making cheese for manufacture, the total time is from approximately 3 to 5 days.

The particulate natural cheese curd of the invention is, as described herein, of particular value, as a cheese for manufacture. However, the natural cheese particulate has other uses, for example as a snack food, or shredded cheese product, as well. Because the particulate natural cheese requires no grinding, as in the case of a conventional cheese block, the particulate cheese curd may, if desired, be packaged directly and marketed in such form of use by consumers. In this connection, the particulate cheese curd may be cured for a period of from about 10 to about 210 days prior to distribution or use in making process cheese.

While the present invention for providing curd particles has been illustrated by describing a cooling process for establishing a curd particle resistant to knitting, a drying step can also be used to establish a curd particle resistant to knitting. A drying step may also be required if the moisture of the particulate cheese curd is too high. A moisture level of from about 33% to about 36% for full-fat cheese is desirable. Non-fat and low-fat cheeses have a higher moisture of up to 40%. The moisture level after draining may sometimes be at a level of from about 37% to about 39%. In this embodiment, the curd particles from the drain table are transferred to a drying bed, where air or other gas is passed over the curd particles to dry the surface of the curd particles. Other methods for drying the curd particles which may be employed are centrifugation and vacuum evaporation. Evaporation under vacuum has the additional advantage of cooling the curd particles without solids loss. The cooling obtained under vacuum evaporation may be sufficient to obviate any further cooling step.

The following examples further illustrate various features of the invention, but are intended to in no way limit the scope of the invention as set forth in the appended claims.

EXAMPLE 1

A full fat cheddar cheese curd was produced using an optional pressing step to provide curd particles for use in the manufacture of process cheese. Two batches of cheese were produced. The batches had the following composition at the indicated levels.

| Raw Material | Vat A | Vat B |
| --- | --- | --- |
| Milk | 1000 lbs. | 1000 lbs. |
| Mesophilic lactic Culture | 17.5 lbs. | 17.5 lbs. |
| Chymax 2x (Rennet) | 50 mls. | 50 mls. |
| Salt | 2 lbs. | 2 lbs. |

The milk was placed into vats A and B and was mixed at 8 rpm. The culture was added to the vats and ripening proceeding at 8 rpm for 1 hour. After ripening 1 hour, the Chymax 2X diluted with 2.0 kg distilled water was added to the vats and mixed for 1 minute. The milk was then held without agitation for 30 minutes to provide a coagulum. The curd was cut by hand with ¼ inch spaced piano wires. The mixers were started after 10 minutes from start of cut at 8 rpm. Cooking was started 15 minutes after the start of cut. Both vats were cooked from 88° F. to 102° F. in 30 minutes. The vats were held at 102° F.

After cooking for 15 minutes, the agitation was increased to 10 rpm. The vats were held at 102° F. while mixing at 10 rpm. until the pH dropped to 5.7–5.8. The curd and whey were then pumped to the drain table. The curd was drained and stirred until the pH of the curd was 5.15. The salt was then added to each batch on the drain table. Both batches were then pressed in five 40 lb. blocks for 5 minutes at 280 lbs. total weight (1.8 psi). 2½ blocks of the pressed cheese (100 pounds) were then placed in a V-Blender and mixed for 1 minute to break up clumps.

Liquid nitrogen was then passed through the V-Blender for 10 minutes until the internal curd temperature of the curd particles reached 40° F. The curd was then packed into containers and stored at 45° F. After a period of 6 weeks, no appreciable curd knitting had occurred.

EXAMPLE 2

The method of the present invention was used to produce a full fat cheddar cheese curd without the use of a pressing step. Two batches of curd were produced having the following composition:

| Raw Material | Vat C | Vat D |
| --- | --- | --- |
| Milk | 1000 lbs. | 1000 lbs. |
| Mesophilic lactic culture | 9.0 lbs. | 7.0 lbs. |
| Thermophilic culture | 9.0 lbs. | 7.0 lbs. |
| Chymax 2X (Rennet) | 50 mls. | 50 mls. |
| Salt | 2 lbs. | 2 lbs. |

The milk was placed in the 2 vats and was heated to 90° F. while mixing at 8 rpm. The culture was added to the vats and ripening proceeded at 8 rpm. for one hour. After ripening for one hour, the Chymax 2X (diluted with 2.0 kg distilled water), was added to the vats and mixed for one minute. The milk was then held without mixing in the vats for 30 minutes. The curd was cut by hand with ¼ inch spaced piano wires.

The mixers were started 10 minutes from the start of cutting at a speed of 8 rpm. Cooking was started 15 minutes after the start of cutting. The curd was cooked in the vats from a temperature of 90° F. to 104° F. in 30 minutes. After cooking for 15 minutes, mixing agitation was increased to 10 rpm. The vats were held at 104° F. and 50% of the whey was predrawn.

The curd in the reduced level of whey was then cooked from a temperature of 104° F. to a temperature of 118° F. in 30 minutes. The curd was then cooled from 118° F. to 104° F. in 15 minutes. The curd was held at 104° F. while mixing at 10 rpm. until the pH dropped to 5.7–5.8. The curd and reduced level of whey was then pumped to the drain table. The curd was drained while being stirred until the pH reached 5.15. The salt was then added to the curd on the drain table.

The curd from the drain table in particulate form was transferred to a V-Blender. The curd was cooled with liquid nitrogen for 10 minutes until the internal curd temperature reached 40° F. The curd from both vats was stored at 45° F. for a period of 2 days under a simulated rail car load. The curd formed small friable clumps, but no substantial knitting of the curd particles was observed.

What is claimed is:

1. A method for making a particulate natural cheese suitable for preparation of process cheese comprising, providing a coagulum from milk by fermenting said milk with a lactic acid starter culture to provide a fermented milk and adding a milk coagulating enzyme to said fermented milk, cutting said coagulum to provide cheese curds and whey, draining said whey from said cheese curds while agitating said curds and cooling said cheese curds with agitation from a temperature of from about 85° F. to about 95° F. to a temperature of from about 40° F. to about 50° F. in less than about 30 minutes so as to provide said cheese curds as separate particles which do not knit during storage.

2. A method in accordance with claim 1 wherein said milk has a fat content of from about 0% to about 4%.

3. A method in accordance with claim 1 wherein said curd particles are loaded into bulk containers for transport after said cooling step.

4. A method in accordance with claim 3 wherein said bulk container is a rail car.

5. A method in accordance with claim 3 wherein said bulk container is a truck.

6. A method in accordance with claim 3 wherein said bulk container is a bulk bag.

7. A method in accordance with claim 1 wherein the curds are pressed prior to cooling.

8. A method in accordance with claim 1 wherein the pH of said curd at the time of cooling is from about 4.8 to about 5.3.

9. A method in accordance with claim 1 wherein said cheese curd particles are cured for a period of from about 10 days to about 210 days.

10. A method in accordance with claim 1 wherein a mixture of a mesophilic lactic starter culture and a thermophilic lactic starter culture are used and said curd is cooked in said whey in two stages, the first cooking stage being at a temperature of from about 100° F. to about 105° F. and the second cooking stage being at a temperature of from about 115° F. to about 120° F.

11. A method in accordance with claim 1 wherein said lactic acid starter culture is a bulk starter culture which is used at a level of from about 10 to about 20 pounds per 1000 pounds of milk.

12. A method in accordance with claim 1 wherein said curd particles are subjected to a drying step concurrently with or prior to said cooling.

13. A method in accordance with claim 12 wherein said drying and cooling is effected by vacuum evaporation.

* * * * *